Figure 2:
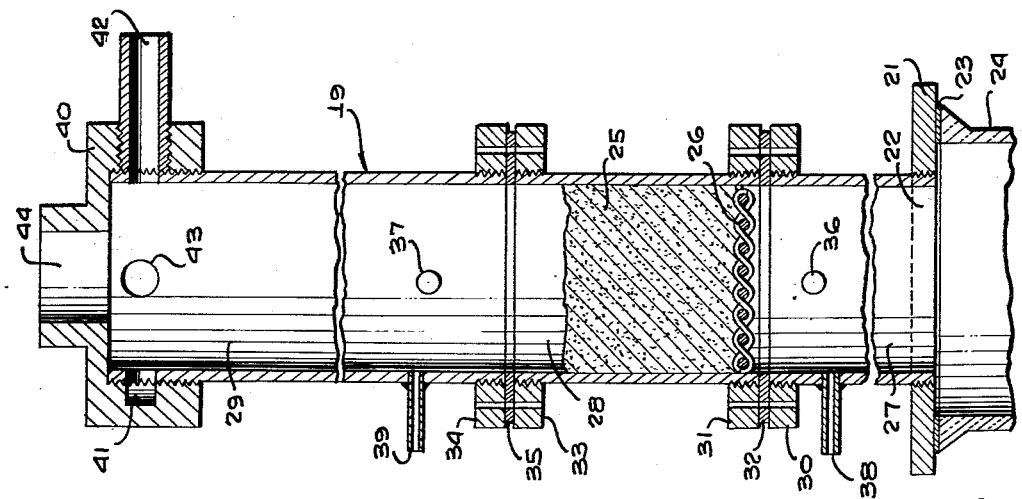

Sept. 18, 1962 J. W. HODGINS ETAL 3,054,191
MASS TRANSFER FROM SOLID TO GASEOUS STAGE
BY MEANS OF SONIC ENERGY
Filed March 13, 1958 4 Sheets-Sheet 1

INVENTORS
JOHN WILLARD HODGINS
& TERRENCE WILLIAM HOFFMAN

BY Stevens, Davis, Miller & Mosher

ATTORNEYS

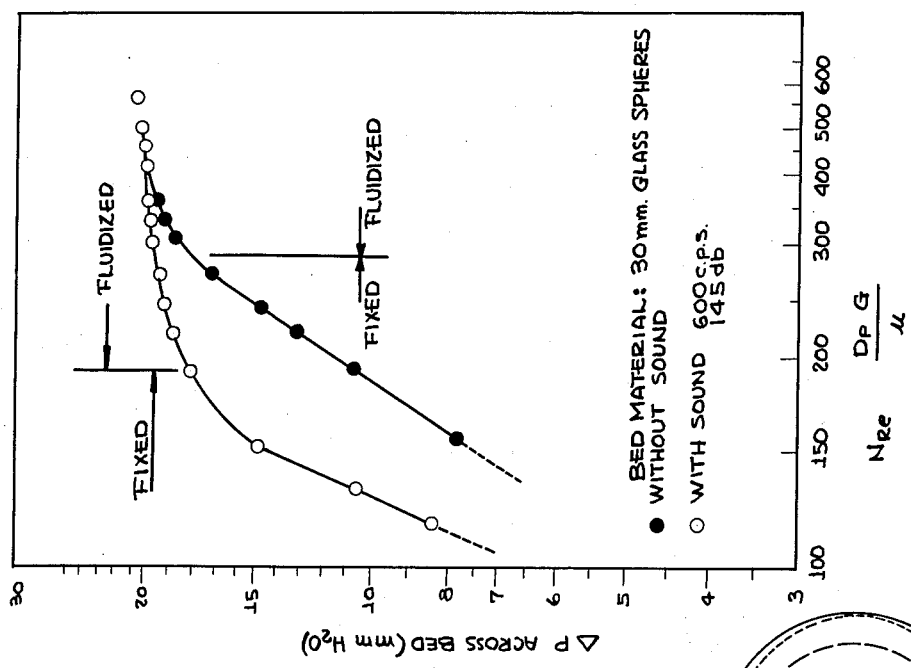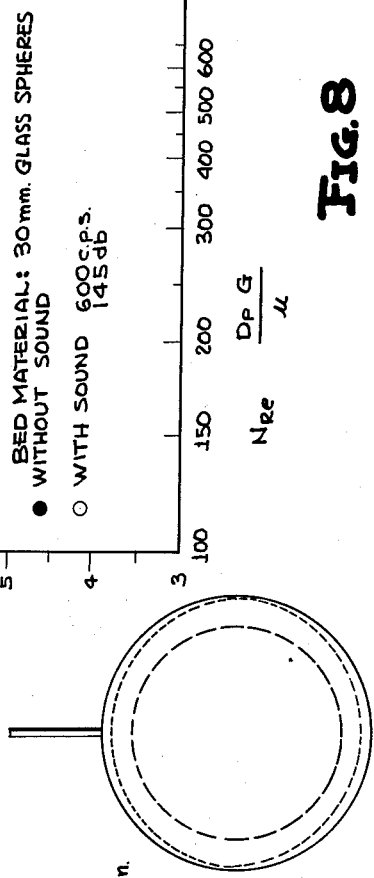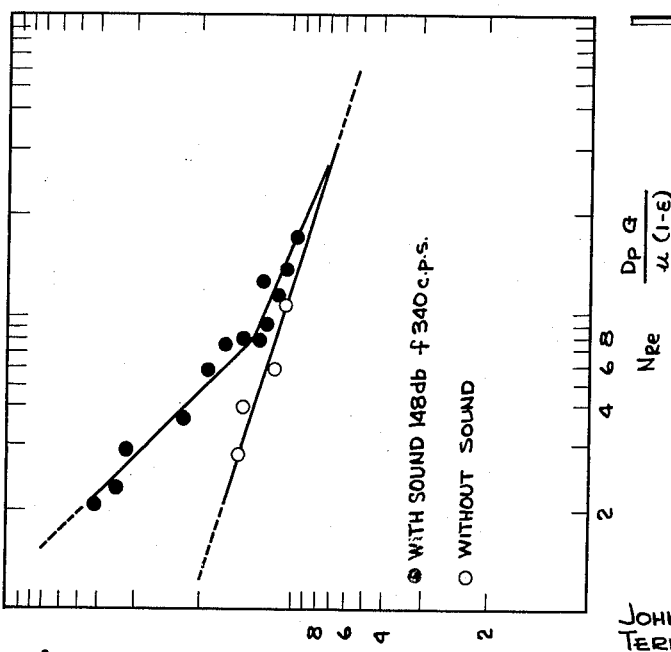

---

United States Patent Office

3,054,191
Patented Sept. 18, 1962

---

3,054,191
MASS TRANSFER FROM SOLID TO GASEOUS STAGE BY MEANS OF SONIC ENERGY
John Willard Hodgins, 25 Joanne Court, Ancaster, Ontario, Canada, and Terrence William Hoffman, 4870 Walkley Ave., Apt. 4, Montreal, Quebec, Canada
Filed Mar. 13, 1958, Ser. No. 721,276
Claims priority, application Canada May 17, 1957
5 Claims. (Cl. 34—4)

This invention relates to a method of improving the rate of mass transfer between a solid phase and a gaseous phase, and particularly to the improvement of the rate of mass transfer between a solid phase and a gaseous phase which is flowing across the surface of the solid phase.

The rate of mass transfer between a solid phase and a gaseous phase is important for many industrial processes such as a catalytic reaction, for example the cracking of gas oil and other petroleum products, roasting, drying and the absorption of gases and vapours in solids. In previously used processes providing for contact between a solid phase and a gaseous phase the solid has been in the form of a fixed bed through or across which the gaseous phase flows, a mechanically moved bed such as a moving hearth furnace, a rotary kiln or a reactor where the catalyst is moved on a conveyor belt or in travelling trays. Contact between gas or vapour and a solid is also obtained in a fluidized bed in which the solid particles are sustained and separated by the flowing fluid.

This invention is particularly concerned with the improvement of mass transfer between a solid phase and a gaseous phase, in a fixed bed or a mechanically moved bed.

The rate at which interchange of material can occur between a given solid phase and a given gaseous phase depends largely on a stagnant film of gas which exists at the solid gas interface. The thickness of this stagnant film is a function, among other variables, of the degree of turbulence at the solid gas interface. The mass transfer obtained between the gas and solid depends upon the thickness of this film and consequently upon the degree of turbulence at the solid gas interface.

One previously used method of decreasing the interface of this stagnant film of gas with mass transfer has been by increasing the velocity of the flowrate of the gas. There are, however, limitations to the extent to which this expedient can be used since if the flowrate is increased, it will ordinarily be necessary to enlarge the size of the solid phase bed to provide an equivalent contact time. The power requirements may become prohibitive and in addition an increased flowrate may give rise to problems such as the entrainment of solids from the bed.

Mechanical agitation of the bed gives rise to similar problems including high power requirements and difficulties in the design of adequate equipment. In addition, the amount of turbulence which can be created at the solid gas interface by mechanical agitation is limited.

The object of this invention is to provide a method of improving the rate of mass transfer between a solid phase and a gaseous phase flowing in surface contact with the solid phase, by creating turbulence at the solid gas interface which is of a greater degree than that attainable by increasing the superficial flowrate.

In accordance with this invention, considered in its broadest aspect, sonic energy is applied at the solid-gas interface under conditions such that a substantially greater degree of turbulence is created at the solid gas interface than the degree of turbulence caused by mechanical means so as to increase the rate of mass transfer between the solid phase and the gaseous phase.

In this disclosure the mass transfer factor $j_d$ will be used to measure the rate at which material is transferred between the gas phase and the solid phase. The relationship of the mass transfer factor with other variables is as follows:

$$j_d = \frac{K_g \cdot P_{bm}(N_{sc})^{2/3}}{G_m}$$

where
$K_g$ = the mass transfer coefficient, lb. moles per hour per square foot per atmosphere pressure
$P_{bm}$ = mean partial pressure of air in interfacial film, atm.
$N_{sc}$ = Schmidt number $$\frac{\mu}{\rho D_v}$$

$G_m$ = mass velocity, superficial molar, lb. mole per hour per square foot
$\mu$ = air viscosity, lbs. per hour per foot
$D_v$ = diffusivity of gas phase in air, per square foot per hour
$\rho$ = density of gas, lbs. per cubic foot.

A modified Reynold's number $N'_{Re}$ will be referred to, to give the turbulence introduced into the bed of solid by the flow of gas, where $$N'_{Re} = \frac{D_p G}{\mu(1-\epsilon)}$$

where
$D_1$ = the diameter of the solid phase particles in ft.
$G$ = mass velocity, superficial lbs. per hour per square foot
$\epsilon$ = the voidage of the bed.

Figure 1:
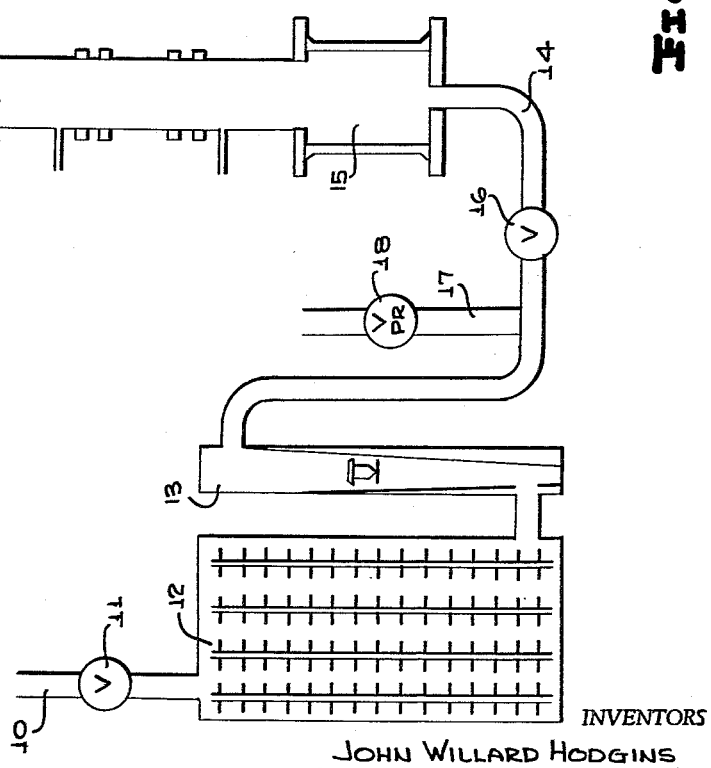
Figure 3:
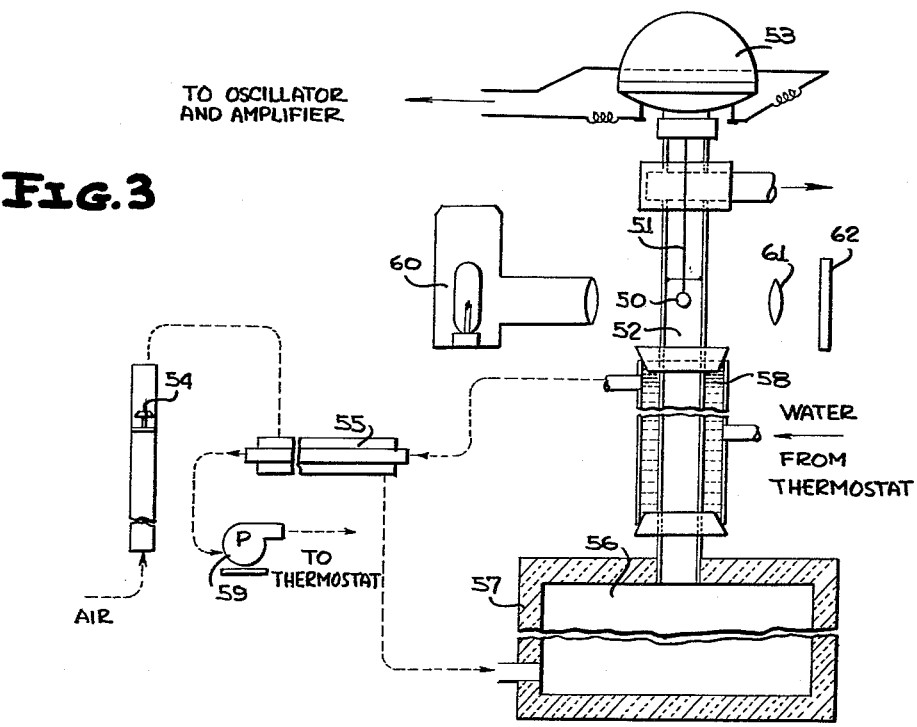
Figure 4:
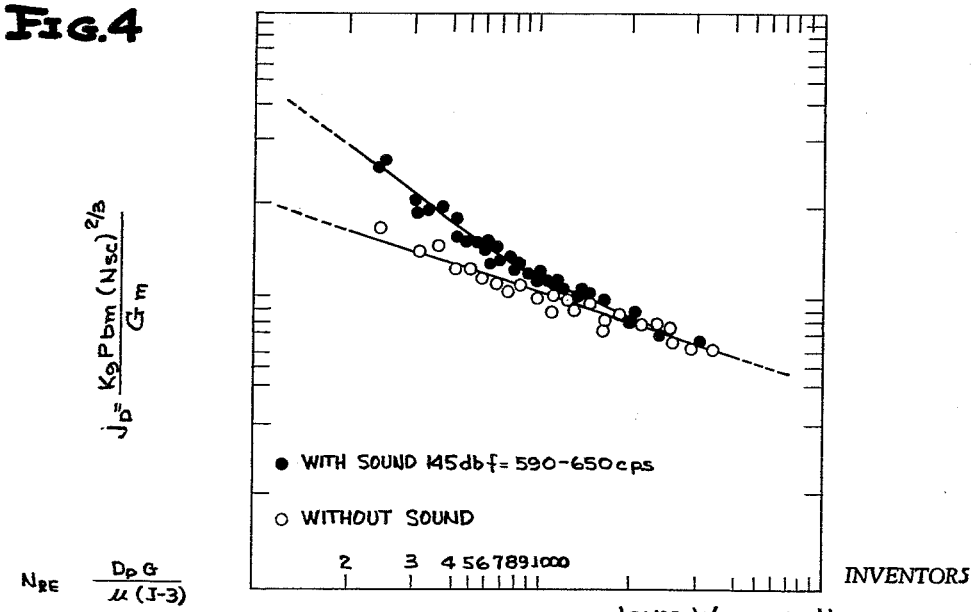
Figure 5:
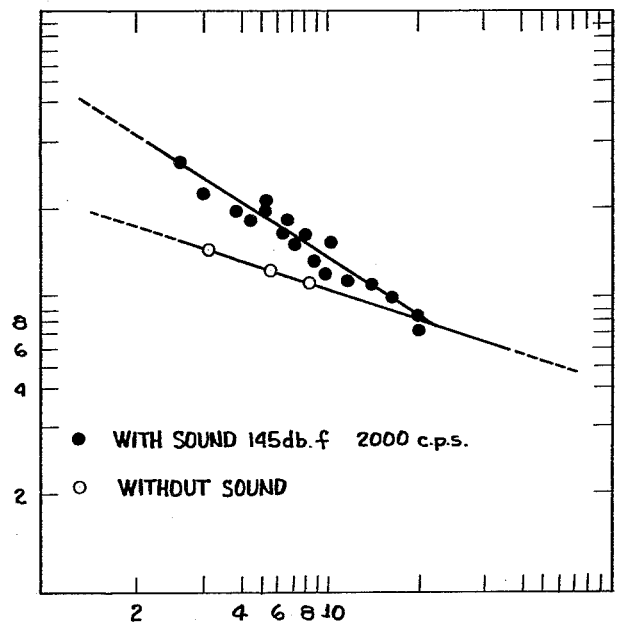
Figure 6:
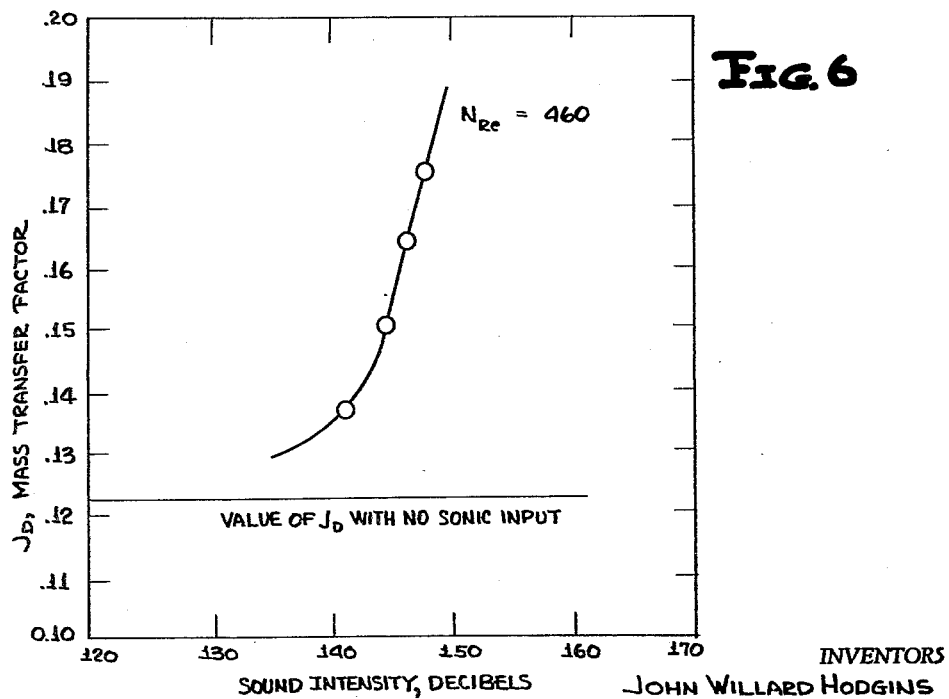

In the drawings illustrating this invention:
FIG. 1 is a diagrammatic elevation view of an apparatus for carrying out the process of this invention;
FIG. 2 is a detail view of part of the apparatus shown in FIG. 1;
FIG. 3 is an elevation view showing a modified form of the apparatus illustrated in FIG. 1, for use in investigating the mass transfer from a single particle of solid;
FIG. 4 is a plot of the mass transfer factor against the modified Reynold's number showing the effect of sound at a frequency of 600 c.p.s. on the mass transfer from a bed of spheres;
FIG. 5 is similar to FIG. 4 but illustrates the effect of sound at a frequency of 2,000 c.p.s. on the mass transfer from a bed of spheres;
FIG. 6 is a plot of the mass transfer factor against the sound intensity in decibels showing the effect of sound intensity on mass transfer from a bed of spheres;
FIG. 7 is a plot of the mass transfer factor against the modified Reynold's number illustrating the effect of sound on the mass transfer from a bed of spheres in a tube from which closed tube resonance has been eliminated;
FIG. 8 is a plot of pressure drop across the bed against the particle Reynold's number showing the effect of sound on the pressure drop across a bed of spheres;
FIG. 9 is a typical profile of a single sphere of solid material showing the effect of sound upon evaporation.

Referring now to FIGS. 1 and 2 of the drawings, an inlet air line 10 having a control valve 11 admits air through a heat exchanger 12. Heat exchanger 12 is used in the experiments described below to bring compressed air, admitted through air line 10, to room temperature which is maintained at constant temperature for the duration of the experiment. The air which has passed through heat exchanger 12 has a flow rate measured by a rotameter 13 and from thence the air is directed by line 14 to a mixing chamber 15. The passage of air through air line 14 is controlled by a quick acting valve 16 and air line 14 is conveniently supplied with a branch line 17 having a pressure release valve 18. Mixing chamber 15 comprises a 6 in. length of flanged glass pipe, and a 4 in. internal chamber packed with 5/16 in. stoneware Raschig rings to minimise channeling of the air flow. A reactor generally indicated by numeral 19 is mounted above mixing chamber 15. As best shown in FIG. 2, the reactor may consist of a cylindrical enclosure 20 mounted by a metal ring 21 having a central aperture 22 on mixing chamber 15. A gasket 23 is interposed between the side wall 24 of mixing chamber 15 and metal plate 21. The reaction chamber 19 comprises a bed of solids 25 supported by 100 mesh stainless steel screen 26. This enables the air to pass freely through the bed of solids without permitting the solids to drop into mixing chamber 15. The reaction chamber is formed in three sections 27, 28 and 29 respectively from synthetic resin tubing. The central section 28 is removable. Sections 27 and 28 are connected together by bolts (not shown) passing through annular flanges 30 and 31 which are secured to sections 27 and 28 respectively. A gasket 32 is interposed between sections 27 and 28. Similarly, sections 28 and 29 are connected together by flanges 33 and 34, threaded to sections 28 and 29 respectively. A gasket 35 is interposed between sections 28 and 29. Thermocouples 36 and 37 are located below and above bed 25 to measure temperatures. The pressures below and above the bed are measured by gauges (not shown) connected to outlet ports 38 and 39. Adapter ring 40 is shaped to provide an annular channel 41 communicating with an outlet port 42. Four equally spaced radial apertures 43 in the side wall of section 29 provide communication between the interior of the reaction chamber and annular channel 41. Adapter ring 40 is also provided with a restricted axial outlet 44 upon which is mounted a sonic energy generating assembly indicated generally by the numeral 45. The sonic energy generating assembly conveniently comprises a transducer operating from a flat response amplifier receiving a signal from a quartz oscillator having a frequency adjustable from 20 to 20,000 cycles per second.

In the experiments described below the sound intensity at the bed level was measured with a hot wire microphone (not shown) which measured the sound as a function of the increased heat transfer from a hot wire due to the agitation of the area. The instrument used was of sufficient accuracy to enable resonant frequencies to be established to an accuracy of about 0.3%.

The solid bed consisted of coated glass spheres 3-6 mm. in diameter, depending upon the value of $N'_{Re}$ desired. In order to make the naphthalene adhere to their surfaces, they were first etched by fluidizing them in a copper column with an air stream containing hydrofluoric acid vapor. Molten naphthalene was then sprayed on the beads as they tossed in a baffled cylinder. The spray was achieved by means of a glass atomizer, and naphthalene, atomizer and incoming air were all kept above the melting point of naphthalene. Spraying was continued until the coating represented about 10% of the total weight of the coated beads (determined by Soxhlet extraction with ether).

In making the experiments described below, the central section 28 of the reaction chamber was removed and weighed with 70 to 100 grams of coated beads. The section was immediately inserted in the apparatus, and the sound (if applicable) and air turned on simultaneously. The inlet air temperature flowrate and pressure were recorded. The outlet air temperature was recorded on a strip chart potentiometer, and the average temperature for the run was subsequently determined by graphical integration of the record. From the weight of naphthalene evaporated from the beads, the mass transfer coefficient could be calculated. These results were obtained for a range of flowrates, in the presence, and in the absence of sound. Measurements were made to determine the effect of frequency and intensity of the added sonic energy on the rate of material transfer from the solid to the gas phase. It was found necessary to fluidize the beads at a high flowrate and high sound intensity before any experimental runs were made, in order to avoid erratic results with freshly coated beads. These erratic results were presumably caused by elutriation of naphthalene dust.

In the modification shown in FIG. 3, mass transfer in a single sphere of naphthalene suspended in an air stream can be investigated. The construction of the apparatus is essentially similar to that described in connection with FIGURES 1 and 2 except as indicated below. The naphthalene sphere 50 is prepared by evaporating pressed naphthalene moth balls in a stream of hot air while retained in a rotating cylinder to allow evaporation to proceed uniformly. Final accurate sizing is accomplished by rolling the sphere through a series of steel dies. The sphere 50 is suspended by a fine steel wire 51 at the axis of a tube 52. A transducer 53 which receives a signal from an oscillator-amplifier combination is mounted at the top of tube 52. Air was passed through flow meter 54 and the jacket of a heat exchanger 55 into a damping chamber 56. This damping chamber is insulated as indicated at 57. A water jacket 58 surrounds the bottom section of tube 52 for control of the air temperature immediately before it reached the naphthalene sphere 50. The water circulated through water jacket 58, is passed through heat exchanger 55 and pumped by pump 59 in a continuous circuit with a thermostat (not shown). This gives an air temperature control of plus or minus 0.1° C. The temperature at the sphere is measured by a calibrated copper-constantan thermocouple and continuously recorded by a strip-chart potentiometer. The progress of the evaporation is followed by projecting the image of the sphere by projector 60 and leads 61 on a target 62.

Sound levels are measured by the previously-mentioned hot-wire microphone, which is also used to determine the resonant frequency. The power input to the horn is read on an electronic watt-meter, and kept at a constant value manually.

To perform an experiment, the following steps are as follows:

(i) The sphere and its hook are weighed on an analytical balance.
(ii) The sphere is attached to the support rod on the adapter at the top of the tube, and the sphere, adapter and horn fixed in phase.
(iii) The air and the signal to the horn are started simultaneously.
(iv) Time, atmhospheric pressure, and tube temperature are recorded.
(v) At the end of the run, the loss in weight of the sphere is determined.

The equipment described with reference to FIGURES 1 and 2 has been employed for measuring the rate at which naphthalene could be evaporated from the surface of glass particles by means of an air stream without any sound being added to the column and comparing this rate with that obtained when sonic energy was applied to the bed. It will be understood that the examples which will be given below are chosen merely to illustrate the phenomena and that the results are directly applicable to any similar system where surface film resistance controls the rate of mass transfer.

EXAMPLE 1

Experiments were conducted with beds of coated beads using 70 grams of coated beads of spherical shape and having an average diameter of 3.0 mm. Typical data for these experiments are shown below in Table I. The runs marked with an asterisk were performed using sound at 600 c.p.s. and 145 decibels. The remaining runs shown in Table I were performed using sound at 650 c.p.s. and having an intensity of 170 decibels.

Table I

| Wt. Loss (grams) | Surface area (square feet) | Duration (hours) | Voidage | Bed Ht. (cm.) | Temp. (° C.) | $N'_{Re}$ | $N_{Sc}$ | $K_g$ | $j_D$ |
|---|---|---|---|---|---|---|---|---|---|
| 0.1443 | 0.692 | 0.050 | 0.48 | 1.9 | 22.8 | 250 | 2.52 | 1.42 | 0.157 |
| *0.1090 | 0.584 | 0.033 | 0.49 | 1.65 | 23.0 | 260 | 2.52 | 2.28 | 0.256 |
| 0.1351 | 0.724 | 0.033 | 0.48 | 1.7 | 23.9 | 360 | 2.52 | 1.83 | 0.142 |
| *0.1386 | 0.584 | 0.033 | 0.49 | 1.65 | 22.9 | 368 | 2.52 | 2.52 | 0.195 |
| 0.1904 | 0.603 | 0.033 | 0.51 | 1.75 | 23.6 | 680 | 2.52 | 2.37 | 0.104 |
| *0.1912 | 0.605 | 0.033 | 0.56 | 2.00 | 23.2 | 685 | 2.52 | 2.68 | 0.127 |

Results for many experimental runs are summarized in FIGURE 4 and FIGURE 5, using the experimental conditions shown. For beds of beads it is seen that maximum enhancment of mass transfer by sound occurs at low values of $N'_{Re}$ when the bed is stationary, and is more pronounced at low frequency.

At the 590 c.p.s. resonance point, there are two lines which describe the mass transfer during sound input, with a change of slope at $N'_{Re}=860$, the point of incipient fluidization. In all cases, no enhancement was observed at $N'_{Re}>2500$.

It was found that a negligible effect was observable at sound intensities below 120 decibels. As will be observed from FIG. 6, the curve of the mass transfer factor plotted against the sound intensity approaches the value of the mass transfer factor with no sonic input at 120 decibels. There is a change in slope of the curve shown in FIG. 6 at a sound intensity greater than 140 decibels and it is, therefore, preferred that the sound intensity be in excess of 140 decibels.

Experiments were conducted with a 1½ in. diameter column with the top of the bed of solids located 3 in. below the transducer opening to establish open tube resonance while eliminating closed pipe resonance. The results obtained under these conditions are illustrated in FIG. 7. It is to be noted that although the enhancement is pronounced at valves of $N'_{Re}<900$, for higher values, the relation between the mass transfer factor and flowrate is the same as for the 3 inch column.

FIG. 8 illustrates the relationship between pressure drop across the bed, the flowrate in the 3 inch column for a shallow bed of 3 mm. naphthalene-coated glass spheres.

EXAMPLE 2

Experiments were conducted with a single sphere of naphthalene using the apparatus described with reference to FIG. 3.

The rate of removal of naphthalene proved to be strikingly dependent upon frequency. Although for the tube used, resonant frequencies occurred at 275, 480, 640, 1320, and 1610 cycles per second, significant enhancement of mass transfer rate occurred only at the lowest of these frequencies. The mass transfer coefficient in a sonic beam (frequency=275 c.p.s.; intensity=160 db) varies but little over a fourfold range of flowrate; the mass transfer for corresponding quiet runs, increases. The values are given in Table II.

Table II

| Sphere dia. (inches) | Air flowrate, c.f.m. | $K_g$ (quiet run) (lb. moles per hour per square foot per atmosphere) | $K_g$ (using sound) | Percent enhancement |
|---|---|---|---|---|
| 0.3125 | 0.50 | 0.302 | 0.97 | 220 |
| 0.3125 | 0.75 | 0.318 | 0.99 | 211 |
| 0.3125 | 1.0 | 0.366 | 1.03 | 182 |
| 0.3125 | 1.50 | 0.414 | 0.98 | 136 |
| 0.3125 | 2.0 | 0.504 | 1.01 | 100 |

A typical trace of the projected profile of a single naphthalene sphere is shown in FIG. 9. The effect of the sonic vibrational energy was invariably that of making the evaporation from the surface of the sphere uniform, rather than having it concentrated on the leading and trailing surfaces. Maximum enhancement occurred when the sphere was located at an antinode in the standing wave, and no improvement was obtained at the position of minimum velocity change at the node.

It is apparent from the foregoing that the location of the bed substantially at the antinode in the standing wave is particularly advantageous for the purpose of carrying out a process in accordance with this invention.

The results of an experiment to determine the effect of sphere diameter upon the mass transfer coefficient in the presence of sound, are shown below in Table III.

Table III

Air velocity _____ft. per second____ 1.4
Sound frequency _____c.p.s.____ 268
Sound intensity _____decibels____ 163

| Dia. of sphere (inches) | $K_g$ (lb. moles hr.$^{-1}$ft.$^{-2}$atm.$^{-1}$) | $N_{Re}\left(\dfrac{D_pG}{\mu}\right)$ |
|---|---|---|
| 0.297 | 1.26 | 203 |
| 0.359 | 1.31 | 246 |
| 0.390 | 1.24 | 268 |
| 0.453 | 1.11 | 314 |
| 0.484 | 1.08 | 335 |
| 0.574 | 0.895 | 410 |

Effects other than increased turbulence at the gas-solid interface could cause an improvement in the mass transfer rate. For example, the values of the diffusivity and of the partial pressure of naphthalene were calculated on the assumption that the temperature of the air effluent from the bed represented the bead surface temperature. In all cases where the sound beam was used, the effluent air did show a temperature rise (0.1 to 0.4° F.), indicating some energy dissipation at the bed. At low flowrate one might suspect that the heat transfer coefficient at the surface of the beads was sufficiently low to allow the bead surface temperature to rise appreciably above that of the effluent air. That this was not the case was demonstrated by measuring surface temperatures during experiments, using fine thermocouples attached directly to beads in the bed.

In every case, the temperature of the effluent air represented the bead surface temperature within 0.1° F. The same was true of the single naphthalent spheres.

The total pressure in the column increases with flowrate. Thus the decrease in enhancement at high flowrate could be caused by the less effective operation of the transducer diaphragm. By repeating some of the low flowrate experiments at elevated pressures, this effect was shown to be negligible over the pressure range involved.

The increased pressure drop across the fixed bed in the presence of sound (FIG. 8) is interpreted as a manifestation of increased turbulence in the air passing through the bed, with the maximum pressure change occuring at the low flowrate. Fluidization of course occurs at a lower flowrate in the presence of sound, and once the bed has become fully fluidized, the pressure drop is not affected by sound input. This behaviour is consistent with the mass transfer measurements. The reason that there appears to be some slight mass transfer enhancement in the fluidized bed is the method of plotting the data; the slightly increased voidage due to the sound has resulted in a higher value for $N'_{Re}$ for a given value of the mass transfer factor. However, at low flowrate, where the voidage in the fluid bed is unaffected by the sound, $N'_{Re}$ is no longer a function of the voidage, and it is under this flow condition that maximum effect is observed. When fluidization develops, increased turbulence manifests itself as kinetic energy used up in expanding the bed. The velocity gradients at the particle surface change but little, thus affecting mass transfer at the boundary layer only slightly.

In air in which sonic resonance is being maintained, the amplitude of the movement of the air particles is inversely proportional to the frequency for a given power input, but the displacement velocity is independent of frequency. Since the mass transfer rate is so very dependent upon frequency, it is apparent that the amplitude of the movement of the air by the sound has a much greater effect than the velocity of the air. Interpretation of these effects in the light of normal turbulence phenomena is questionable, for the velocity imparted to the air particles by the sound is 10–20 times greater than the superficial air velocity through the tube. For this reason, an increase in the superficial air flowrate in the tube did not change in the mass transfer rate at constant sonic power.

With a constant sound input and flowrate (Table III), the mass transfer coefficient decreases with increasing size of sphere. This is to be expected for turbulent flow of air past the solid sphere—the mass transfer coefficient should be a function of the $(D_p)^{-n}$.

Mass transfer enhancement is not so sharply dependent upon frequency when measurements are made on a packed bed rather than on a single sphere. The reason for this behaviour is not apparent.

It is apparent from the foregoing that the addition of sonic vibrational energy at low frequency and at intensity greater than 120 decibels significantly increases the rate at which material is transferred across solid-gas interfaces in a bed of solids. The enhancement is greatest for low flows of gas through fixed beds, and the improvement is negligible when full fluid fluidization has developed. Maximum effect was observed at sonic resonance for low frequency sound (200–600 cycles per sound), although there may be an increase in effect at very high resonant frequencies, where the intensity of turbulence is very high.

By the method of this invention it has been found possible to improve the mass transfer rate by about 120% in the case of beds of spheres and a maximum improvement of about 220% has been achieved in the case of a single sphere.

What we claim is:

1. A method of improving mass transfer of a sublimable solid particulate from a solid phase to a gaseous phase in moving surface contact with the solid phase at a flowrate insufficient to fluidize the solid phase, comprising the step of reducing the resistance of an interfacial film between the solid phase and the gaseous phase by passing a gas over the solid material and applying sonic energy to produce turbulence at said interfacial film, said solid phase being located substantially at the antinode in the standing wave created by said sonic energy, said sonic energy having a frequency of about 100 to 700 c.p.s. and being at a frequency and sound pressure level ineffective to fluidize the solid phase at said flowrate.

2. A method as in claim 1, in which the frequency of the sound is between 200 and 600 c.p.s.

3. A method as in claim 1, in which the mass transfer rate is improved by an amount in excess of about 120%, in comparison to the mass transfer rate without the application of sonic energy.

4. A method as in claim 1, in which the sound has an intensity in excess of 140 decibels.

5. A method of improving the mass transfer of a sublimable particulate material from a solid phase to a gaseous phase in moving surface contact with the solid phase, comprising the step of passing a gas over the solid material creating turbulence at an interfacial film between the solid phase and the gaseous phase by applying sonic energy at said interface at a sound intensity in excess of 140 decibels and at a frequency of about 100 to 700 c.p.s., said solid phase being located substantially at the antinode in the standing wave created by said sonic energy, the flowrate between the gaseous phase and the solid phase in the presence of said sonic energy being adjusted to a level insufficient to fluidize said solid phase.

References Cited in the file of this patent

UNITED STATES PATENTS

| | | |
|---|---|---|
| 2,344,754 | Vang | Mar. 21, 1944 |
| 2,514,797 | Robinson | July 11, 1950 |
| 2,576,297 | Horsley et al. | Nov. 27, 1951 |
| 2,578,377 | Smith | Dec. 11, 1951 |
| 2,664,274 | Worn et al. | Dec. 29, 1953 |
| 2,667,706 | Morse et al. | Feb. 2, 1954 |

FOREIGN PATENTS

| | | |
|---|---|---|
| 532,144 | Great Britain | Jan. 17, 1941 |